(12) United States Patent
Nordh

(10) Patent No.: US 8,365,687 B2
(45) Date of Patent: Feb. 5, 2013

(54) TUBE SHIELD AND A METHOD FOR ATTACHING SUCH SHIELD TO A BOILER TUBE

(75) Inventor: Lennart Nordh, Gothenburg (SE)

(73) Assignee: Metso Power AB, Gothenburg (SE)

( * ) Notice: Subject to any disclaimer, the term of this patent is extended or adjusted under 35 U.S.C. 154(b) by 820 days.

(21) Appl. No.: 12/529,937

(22) PCT Filed: Mar. 15, 2007

(86) PCT No.: PCT/SE2007/050162
§ 371 (c)(1),
(2), (4) Date: Sep. 4, 2009

(87) PCT Pub. No.: WO2008/111885
PCT Pub. Date: Sep. 18, 2008

(65) Prior Publication Data
US 2010/0101511 A1    Apr. 29, 2010

(51) Int. Cl.
*F22B 37/10*    (2006.01)
(52) U.S. Cl. .................................. 122/511; 165/134.1
(58) Field of Classification Search .................. 122/511, 122/512; 165/134.1; 138/110
See application file for complete search history.

(56) References Cited

U.S. PATENT DOCUMENTS

| | | | | |
|---|---|---|---|---|
| 1,884,741 A * | 10/1932 | Kleffel | ......................... | 122/303 |
| 3,516,480 A * | 6/1970 | Woltering | ..................... | 164/312 |
| 3,828,735 A * | 8/1974 | Graham et al. | ............... | 122/6 A |
| RE30,647 E * | 6/1981 | Blose | ......................... | 285/332.2 |
| 4,304,267 A * | 12/1981 | Campbell, Jr. | ................ | 138/149 |
| 4,682,568 A * | 7/1987 | Green et al. | ............. | 122/235.14 |
| 4,776,790 A * | 10/1988 | Woodruff | ...................... | 432/233 |
| 5,724,923 A * | 3/1998 | Green | ......................... | 122/511 |
| 5,881,802 A * | 3/1999 | Green | ......................... | 165/134.1 |
| 6,152,087 A * | 11/2000 | Shibata et al. | ................ | 122/512 |
| 7,628,611 B2 * | 12/2009 | Beiter et al. | .................. | 432/234 |
| 2005/0116468 A1 * | 6/2005 | Otten | ............................. | 285/90 |

FOREIGN PATENT DOCUMENTS
CH    444188    2/1968

* cited by examiner

*Primary Examiner* — Gregory A Wilson
(74) *Attorney, Agent, or Firm* — Rolf Fasth; Fasth Law Offices

(57) ABSTRACT

A tube shield has a cylindrical shape and adapted to be attached with refractory cement (R) around an outer peripheral surface of a boiler tube (T). The tube shield has at least two tube shield parts for surrounding the boiler tube (T). The shield parts has complimentary parting surfaces for defining a gap between abutting complimentary parting surfaces of adjacent shield parts when the shield parts are attached with refractory cement (R) around the boiler tube (T). Each shield part encloses 140-220° of the total circumference of the boiler tube (T). Each complimentary parting surface is configured in a dovetail form such that one shield part is locking into the other shield part with dovetail protrusions (DP) located in dovetail slots (DS) in the other shield part.

6 Claims, 8 Drawing Sheets

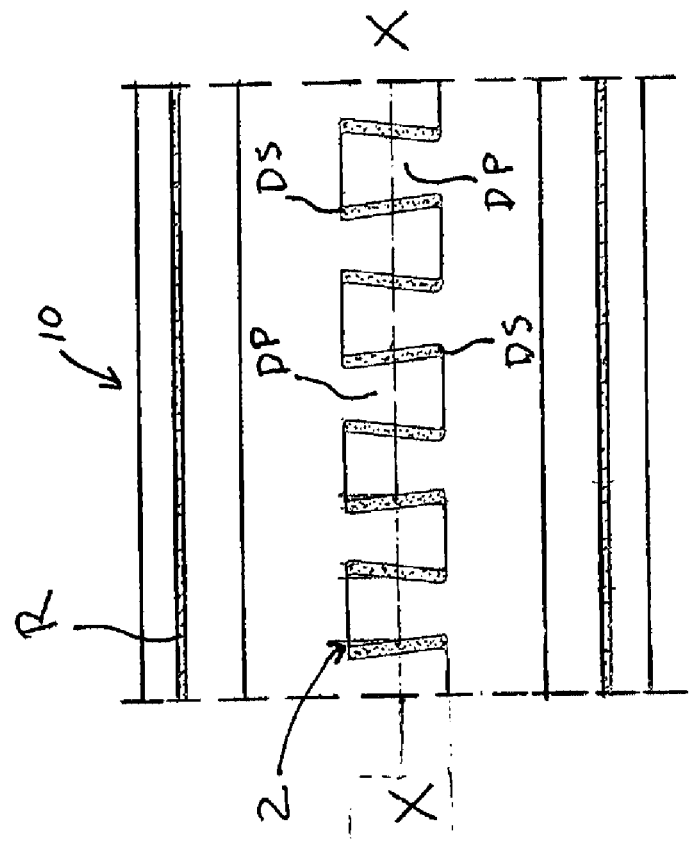
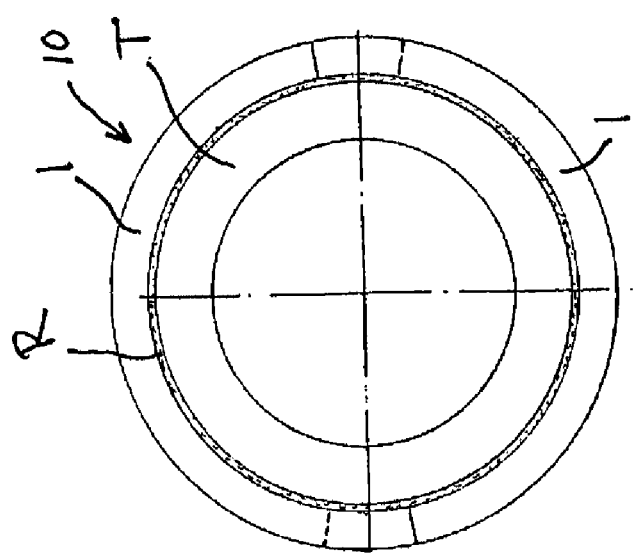
Fig. 1b
Fig. 1a

TUBE SHIELD AND A METHOD FOR ATTACHING SUCH SHIELD TO A BOILER TUBE

PRIOR APPLICATION

This application is a U.S. national phase application based on International Application No. PCT/SE2007/050162, filed 15 Mar. 2007.

TECHNICAL FIELD

The present invention relates to a boiler tube shield in attaching such a shield to a boiler tube.

BACKGROUND AND SUMMARY OF THE INVENTION

U.S. Pat. No. 6,152,087 discloses a boiler tube shield having a cylindrical or semi-cylindrical shape and adapted to be attached around an outer peripheral face of a boiler tube with mortar. The boiler tube shield includes a plurality of ceramic bodies closely arranged along their parting planes, wherein the parting planes includes a restraining portion for restraining slippage of each of the ceramic bodies.

U.S. Pat. No. 6,136,117 disclose a method of attaching a boiler tube shields having a cylindrical or semi-cylindrical shape around an outer peripheral face of a boiler tube with mortar. The boiler tube shields, are a plurality of ceramic bodies closely arranged along their parting planes, wherein the parting planes includes means for restraining slippage of each of the ceramic bodies along the parting planes.

The tube shields in U.S. Pat. Nos. 6,152,087 and 6,136,117 requires that tube shield halves are pushed together axially into the locking position, whereby it is impossible to apply this kind of tube shield on a tube bend. During application of the tube shield must halves be pressed towards the original tubes against the resistance of the mortar while pushing at least one of the halves axially. This makes assembly cumbersome. The design will also make it difficult to replace individual tube shield halves if more than one set of tube shield halves are mounted on the original tubes, as the individual tube shield half to be replaced needs to be pushed axially over the tube against the tube shield halves already mounted.

An object of the invention is to provide a boiler tube shield and a method for attaching such a tube shield to a boiler tube, which can assuredly protect the boiler tube from corrosion or erosion or a combination of both corrosion and erosion.

A further object with the invention is to provide a tube shield which has a better means for restraining slippage of the tub shield parts, compared to the two US documents above.

Yet another object with the invention is to provide a method for assembling the inventive tube shield and enabling replacement of individual tube shield halves.

A further object is to enable a tube shield system enabling the same solution also for tubes bends having a curvature.

Still another object is to enable a tube shield protecting system being less cumbersome to install, requiring a simple assembly procedure, where halves are simply only pressed over the original tubes to be protected, and where the refractory cement is pressed out into the gaps between halves and after curing establish the necessary locking function for the halves.

The tube shield according to the claimed invention has a cylindrical or semi-cylindrical shape and is, adapted to be attached around an outer peripheral face of a boiler tube with refractory cement. The boiler tube shield comprising at least two shield parts closely arranged along their parting planes, positioned on a part of the original boiler tubes, and wherein the parting planes of the shield parts comprise means for locking each of the shield parts along the parting planes. The tube shield is divided into two halves, and their parting planes extend substantially axially. The locking means includes a dovetail engagement. The parting planes of the shield parts may be inclined or parallel to a flat plane containing a central axis of the cylindrical or semi-cylindrical boiler tube shield, when assembled around the boiler tube in the form of the shield. The parting plane of each shield part at each of both sides thereof may comprise a dovetail portion for locking each shield part along the parting plane. In the boiler tube shield, the dovetail portion preferably forms a locking with respect to the parting plane of each shield part that movement of the shield part in a direction orthogonal to said parting plane may be restrained.

These and other objects, features and advantages of the invention will be easily appreciated upon the reading of the following description of the invention when taken in conjunction with the attached drawings, with the understanding that some modifications, variations and changes of the same could be easily made.

BRIEF DESCRIPTION OF THE DRAWINGS

Reference is made to the attached drawings, wherein:

FIGS. 1a/1b shows the inventive tube shield comprising two shield parts for surrounding a boiler tube, wherein one shield part is locking into the other shield part with dovetail protrusions located in dovetail slots in the other shield part.

DETAILED DESCRIPTION OF THE INVENTION AND PREFERRED EMBODIMENTS

Figure 2A:
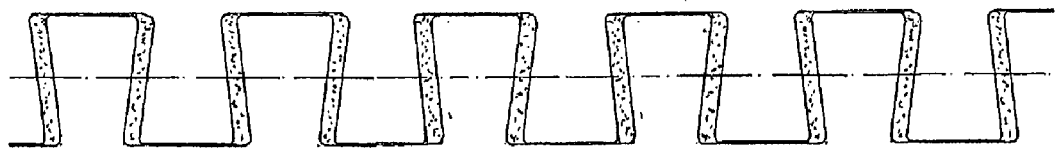
FIGS. 2a/2b shows the joint between the tube shield parts more in detail.

The boiler tube shield according to the present invention is comprised of a heat resistant material having excellent corrosion and erosion resistance, either a ceramic material or a high alloy steel material.

In case of ceramic material however, in order to minimize reduction in heat conductivity of that portion of the boiler tube at which the boiler tube shield is attached, it is preferable to select a ceramic material having excellent heat conductivity. As such a ceramic material having both corrosion resistance and heat conductivity, SiC may be recited by way of example. Ceramic materials in the tube shield are preferable for super heaters in waste boilers where tubes are subjected to a very aggressive environment and/or where durability is favored. The dove tail form according to the invention, in detail described in following parts, made in such tube shield in any such ceramic material could be made having a dove tail protrusions being at least 30 mm wide and with a tube shield thickness of some 5-10 mm, which will impose a sufficient mechanical strength. If the tube shield is made from high alloy steel, material it would be sufficient to have a dove tail protrusion being at least 10 mm wide in order to impose the sufficient mechanical strength of the dove tail, preventing breakage thereof during mounting.

As refractory cement to attach the boiler tube shield to the outer peripheral face of the boiler tube, SiC based refractory cement, alumina based refractory cement or the like may be used. For the same reason as stated above, it is preferable to select SiC based refractory cement. Ceramic fibers may be used instead of a part or an entire part of the ceramic material. The ceramic fibers may be used in a mixed state with refractory cement, or appropriate ceramic fiber-based refractory cement may be used for this purpose. The term "refractory cement" used in the claims includes refractory cement itself and the above ceramic fibers.

In the following, preferred embodiments of the present invention will be described.

In the following detailed description the term "dovetail" will be used. A dovetail has generally a top-truncated triangular form with a dovetail base in the truncated top of the triangle and a dovetail top in the base of the triangle.

FIGS. 1a and 1b are view illustrating an embodiment of the inventive tube shield according to the present invention. The tube shield 10 has a cylindrical shape and is adapted to be attached with refractory cement R around an outer peripheral surface of a boiler tube T.

The tube shield 10 comprising two tube shield parts 1, made from heat resistant material, for surrounding the boiler tube T. The tube shield parts 1 having complimentary parting surfaces for defining a gap between abutting complimentary parting surfaces of adjacent tube shield parts 1 when the tube shield parts 1 are attached with refractory cement R around a boiler tube T; and wherein each tube shield part 1 enclose 140-220°, preferably 180° of the total circumference of the boiler tube T.

Each complimentary parting surface is configured in a continuous dovetail form such that one shield part is locking into the other shield part with a multitude of dovetail protrusions DP located in corresponding dovetail slots DS in the other shield part as shown in figures.

A first part 2 of the parting surfaces of the shield parts 1 is parallel to a plane containing a central axis x-x of the tube shield 10 and the dovetail protrusions DP in each shield part 1 are oriented in the circumference direction of the tube shield 10.

Figure 2B:
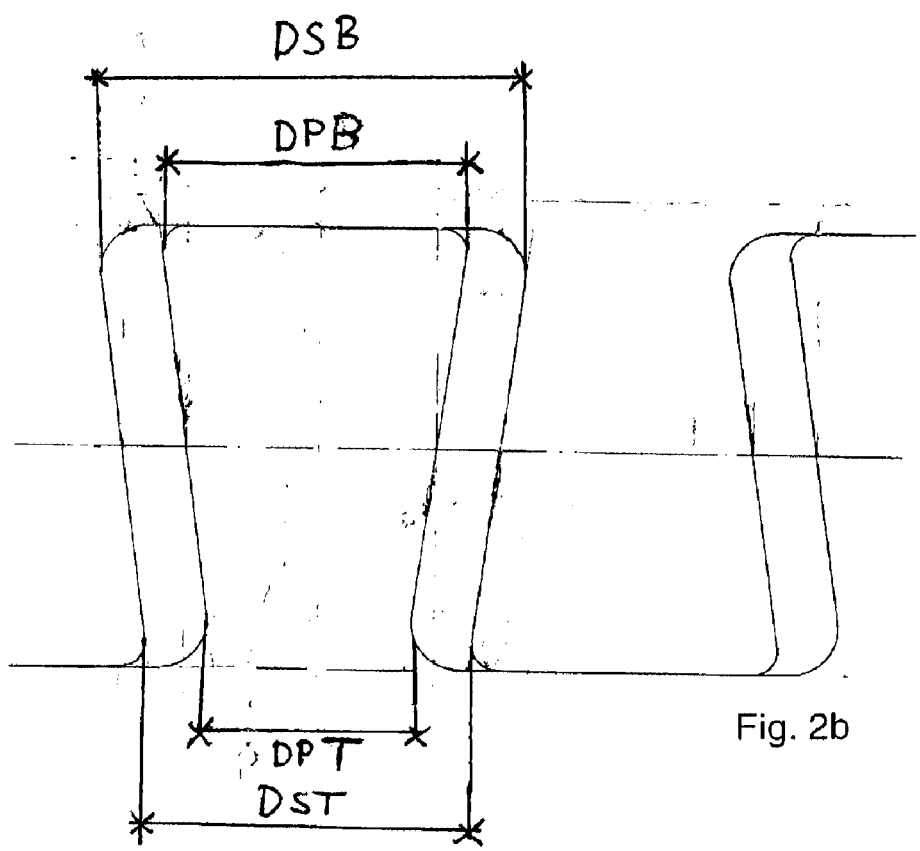

FIGS. 2a and 2b illustrates that each dovetail protrusion DP in one shield part 1 has a dovetail protrusion base DPB having a first dimension and a dovetail protrusion top DPT having a second dimension.

Each complementary dovetail slot DS in the other shield part has a dovetail slot base DSB having a third dimension and a dovetail slot top DST having a fourth dimension.

The dimension of the dovetail protrusion base DPB of the dovetail protrusion is equal or slightly less than the dovetail slot top DST of the dovetail slot. When tube shields parts are assembled together until the dovetail protrusion base rests against the dovetail slot base, a gap between dovetail protrusions DP and dovetail slots DS is formed in the axial direction of the tube: This gap will become filled with refractory cement R as refractory cement is pushed out when halves are pressed together until protrusion base and slot base is in an abutting position. When the refractory cement is cured will the halves be locked into position. Until the refractory cement is cured could halves be pressed together using a simple adjustable clamp.

Figure 3A:
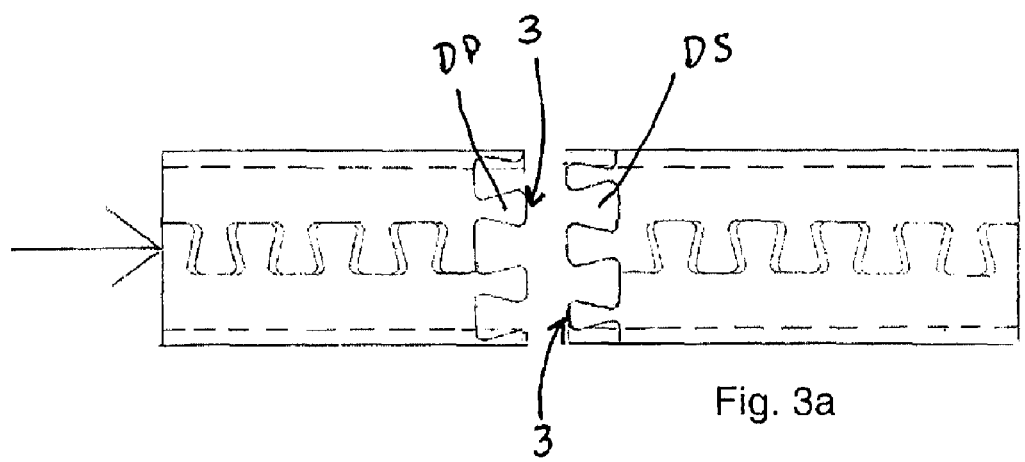
FIGS. 3a/3b shows an embodiment of the invention wherein the dovetail protrusions in each shield part are also oriented in the axial direction of the tube shield.
Figure 3B:
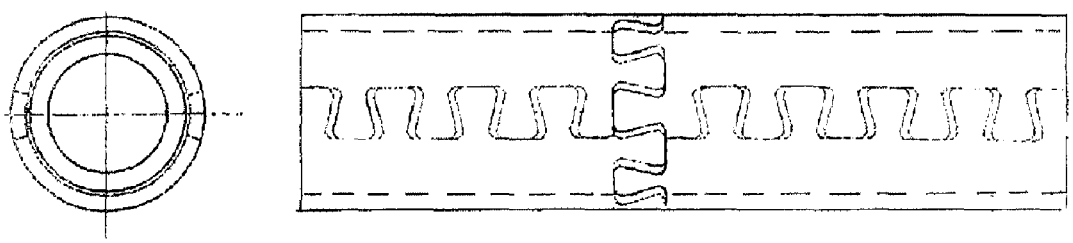

In FIGS. 3a and 3b are the tube shield parts also equipped with interlocking means enabling locking of another set of tube shield parts with an already assembled set of tube shield parts. Here a second part 3 of the parting surfaces of the shield parts 1 is parallel to a plane orthogonal to the central axis of the tube shield 10, and wherein the dovetail protrusions DP in each shield part 1 are oriented in the axial direction of the tube shield 10.

Figure 4A:
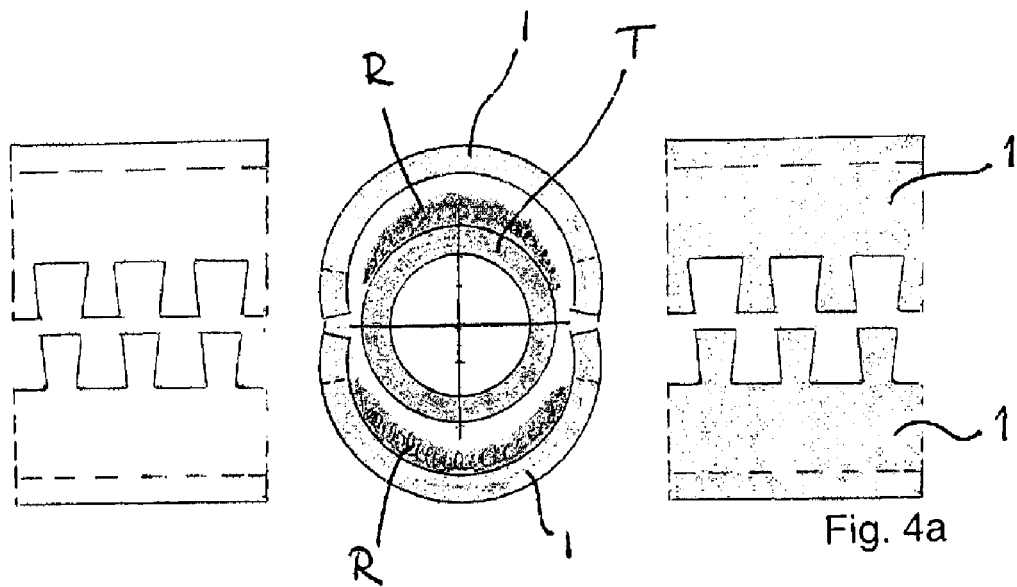
FIGS. 4a-4c shows a method for assembling the tube shield.
Figure 4B:
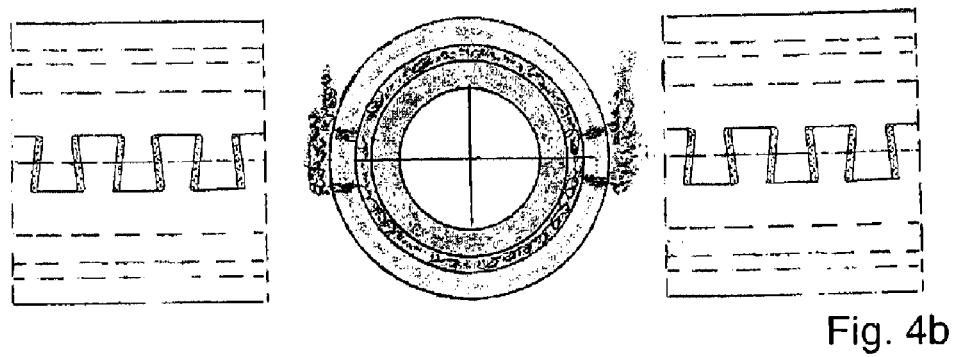
Figure 4C:
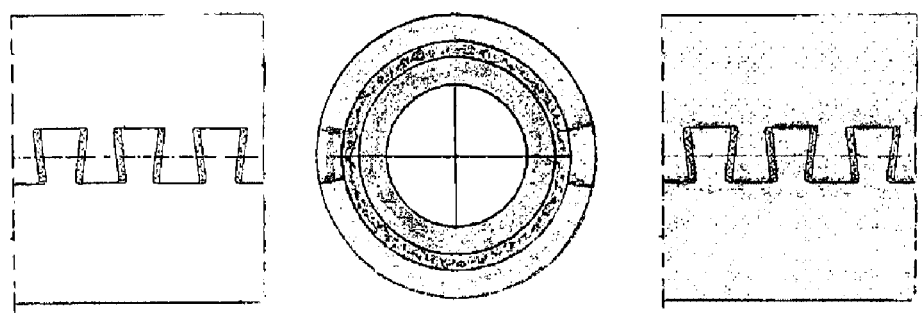

FIGS. 4a, 4b and 4c disclose a method for assembling the inventive tube shield 10 on a boiler tube T, wherein tube shield parts are assembled over the boiler tube and fixated with refractory cement R.

The method comprising the steps of:

Each tube shield part 1 is filled at least partly with refractory cement R.

Each tube shield part 1 is thereafter mounted around the boiler tube while pushing dovetail protrusions DP of one tube shield part into engagement with dovetail slots DS in the other tube shield part, while pressing excessive refractory cement out trough the adjoining complimentary parting surfaces of the tube shield parts.

The tube shield parts are pushed into each other until the roof of a dovetail protrusion in one tube shield part rests against the bottom of the dovetail slot in the other tube shield part, thus forming a cylindrical tube shield around the boiler tube.

Holding the tube shield parts in location, preferably using a clamp, until the refractory cement cures and fixates the tube shield parts around the boiler tubes.

Deleting any excessive refractory cement protruding from the adjoining complimentary parting surfaces of the tube shield parts.

Figure 5A:
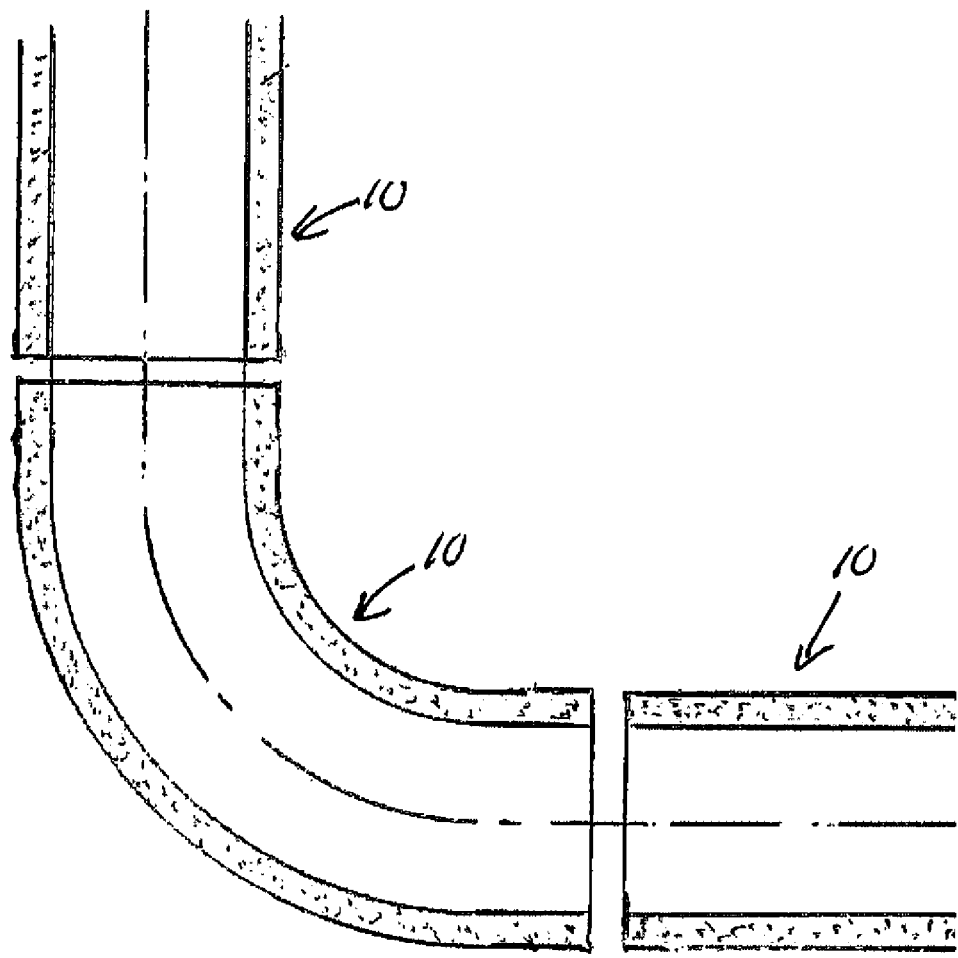
FIGS. 5a/5b shows an embodiment how to protect bend tubes with tube shields.
Figure 5B:
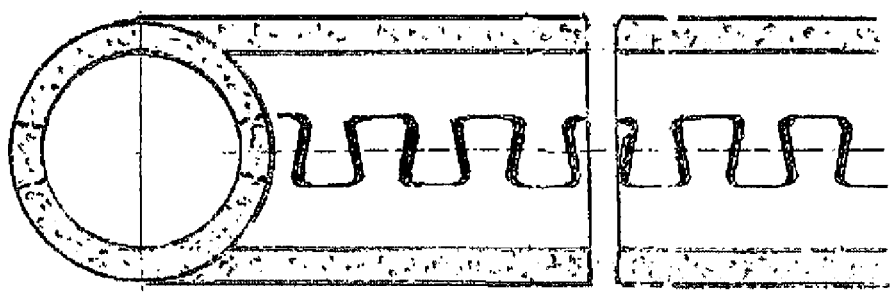

Holding the tube halves together during curing of the refractory material could be made using a hose clamp that could be permanently mounted or using an adjustable clamp detached after curing. The permanent clamp could be made in some non resistant material that after mounting and curing of the refractory material quickly corrodes when the boiler is put into operation The invention with tube shields using shield parts with the dovetail solution are also applicable on tube bends, which will be described more in detail with references to FIGS. 5, 6, 7 and 8:

FIGS. 5a and 5b disclose two tube shield parts where one of the two shield parts complimentary parting surface abutting the other complimentary parting surface of adjacent shield part along the plane of symmetry and wherein the shield parts are attached with refractory cement around the boiler tube. The shield parts have straight edges in the joint between the bend tube shield portion and the two straight tube shield portions.

Figure 6A:
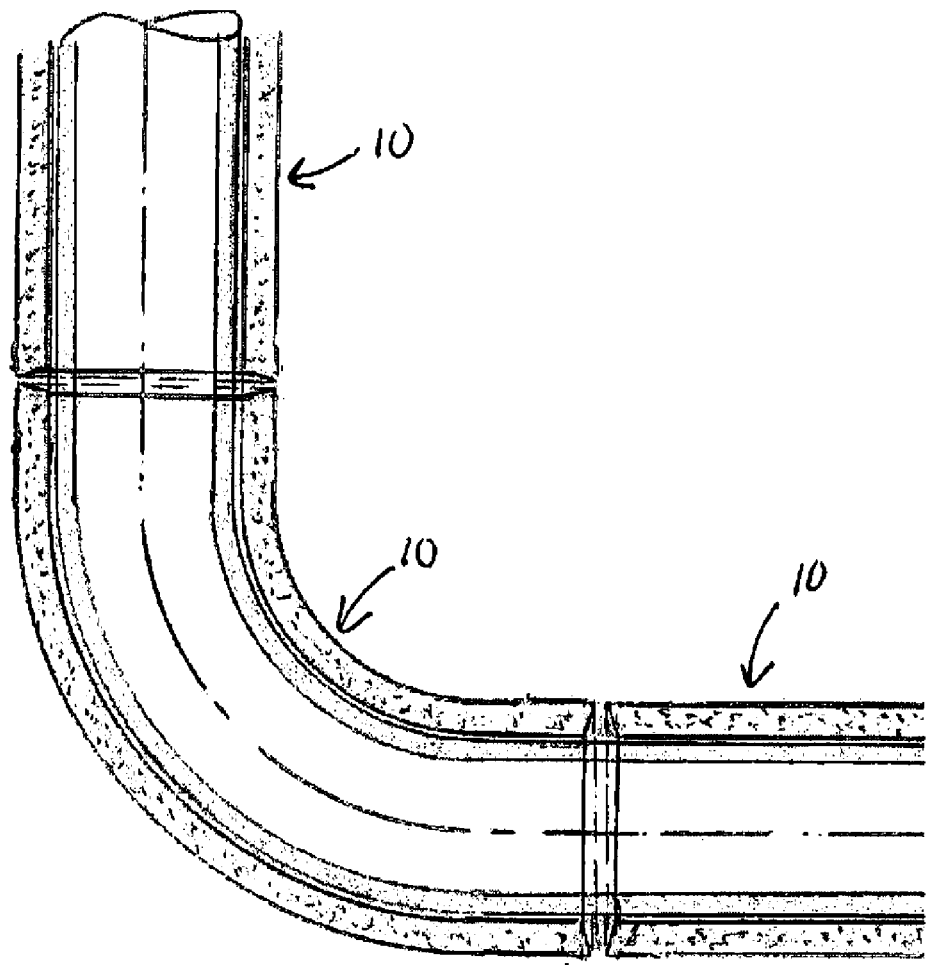
FIGS. 6a/6b shows an alternative joint between two adjacent tube shield portions.
Figure 6B:
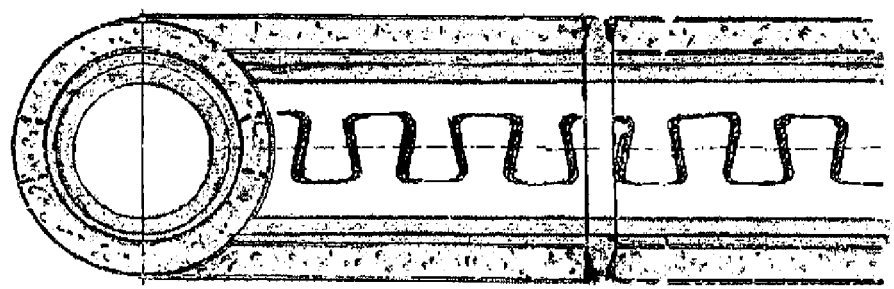

FIGS. 6a and 6b disclose an alternative embodiment to FIG. 5, where the shield parts have inclined edges in the joint between the bend tube shield portion and the two straight tube shield portions, in order to keep the refractory cement in place.

Figure 7A:
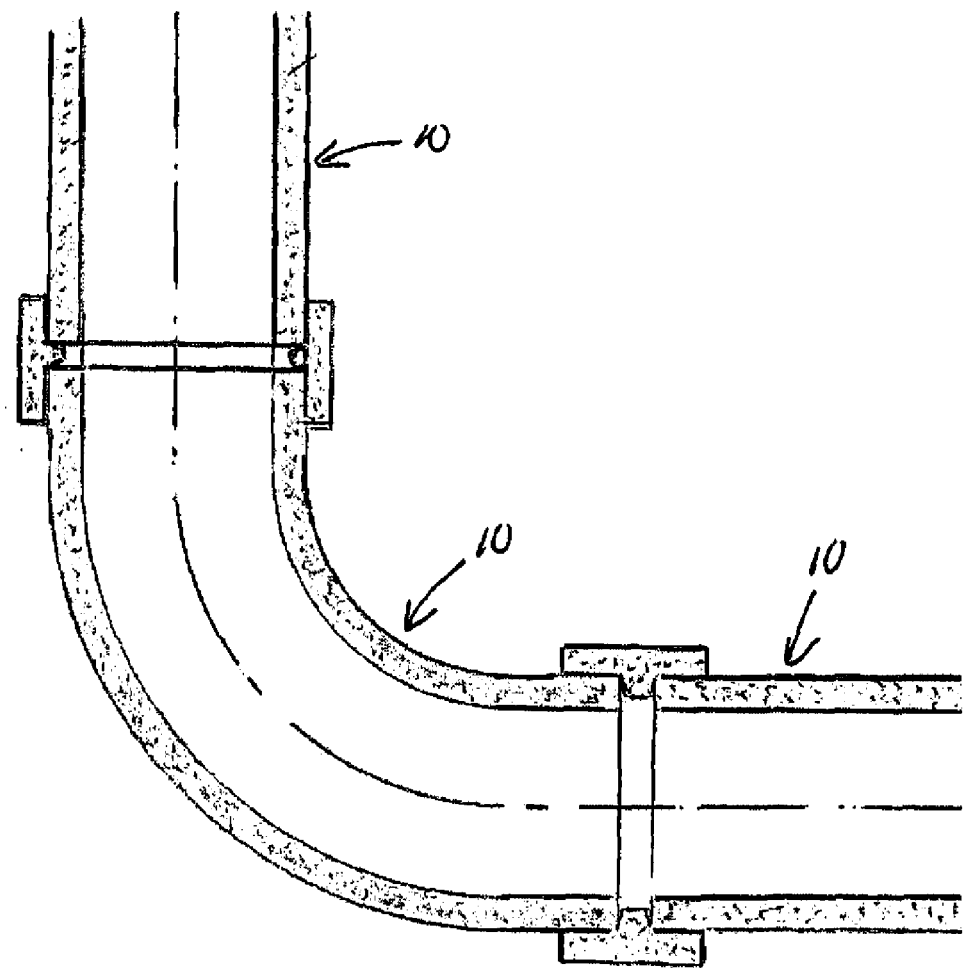
FIGS. 7a/7b shows yet another joint between two adjacent tube shield portions.
Figure 7B:
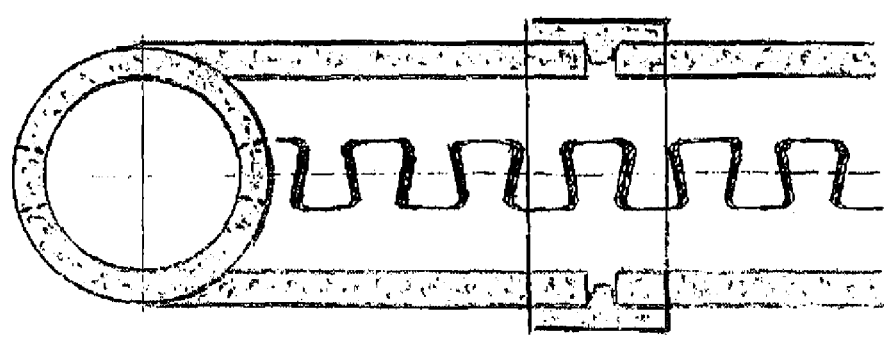

FIGS. 7a and 7b disclose another embodiment where a ring comprising two halves for surrounding the joint between the tube shields 10.

Figure 8A:
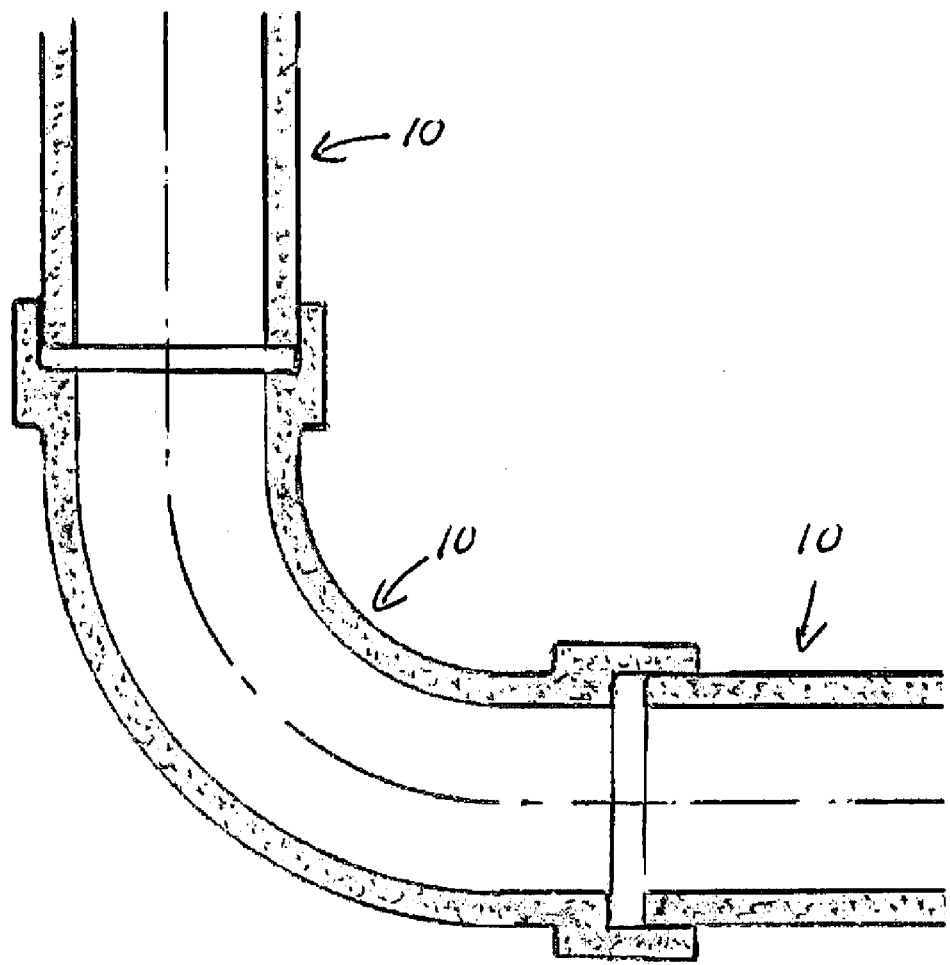
FIGS. 8a/8b shows a further embodiment of a joint between two adjacent tube shield portions.
Figure 8B:
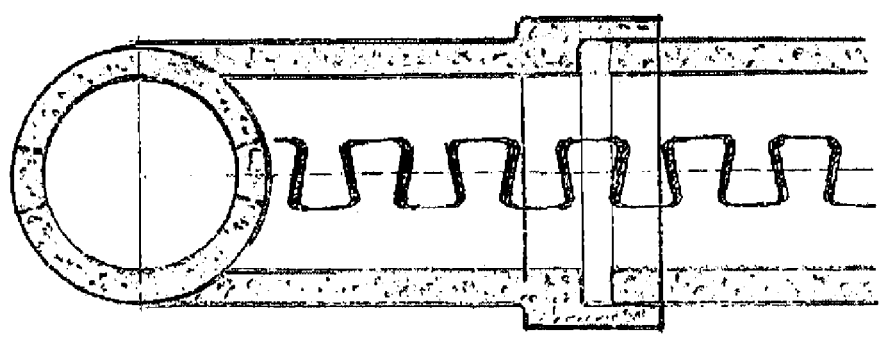

FIGS. 8a and 8b disclose yet another embodiment where one of the adjacent shield tubes including a sleeve portion that covers the joint. The cavity in the joint is filled with refractory cement.

While the present invention has been described in accordance with preferred compositions and embodiments, it is to be understood that certain substitutions and alterations may be made thereto without departing from the spirit and scope of the following claims.

Further aspects and advantages of the invention are set out in the dependent claims.

The invention claimed is:

1. A tube shield having a cylindrical shape and adapted to be attached with refractory cement (R) around an outer peripheral surface of a boiler tube (T), the tube shield, comprising:
   at least first and second shield parts for surrounding the boiler tube (T), the first and second shield parts having complimentary parting surfaces for defining a gap between abutting complimentary parting surfaces of adjacent shield parts when the first and second shield parts are attached with refractory cement (R) around the boiler tube (T);
   each shield part enclosing 140-220° of a total circumference of the boiler tube (T),
   each complimentary parting surface being configured in a continuous dovetail form,
   a dovetail protrusion (DP) in in the first shield part with a dovetail protrusion base (DPB) having a first dimension and a dovetail protrusion top (DPT) having a second dimension, the dovetail protrusion (DP) extending in a circumferential direction,
   a corresponding dovetail slot (DS) in the second shield part with a dovetail slot base (DSB) having a third dimension and a dovetail slot top (DST) having a fourth dimension, the dovetail slot (DS) extending in the circumferential direction;
   the first dimension of the dovetail protrusion base (DPB) of the dovetail protrusion (DP) being equal or less than the fourth dimension of the dovetail slot top (DST) of the dovetail slot,
   means for assembling the first and second shield parts together to form a gap between the dovetail protrusion (DP) and dovetail slots (DS), and
   means for filling the gap with refractory cement (R) such that the first shield part is locking into the second shield part with a multitude of dovetail protrusions (DP) located in a corresponding multitude of dovetail slots (DS) in the second shield part.

2. The tube shield of claim 1, wherein a first part of the parting surfaces of the shield parts is parallel to a plane containing a central axis of the tube shield, and the dovetail protrusions (DP) in each shield part are oriented in the circumference direction of the tube shield.

3. The tube shield of claim 2, wherein a second part of the parting surfaces of the shield parts is parallel to a plane orthogonal to the central axis of the tube shield, and the dovetail protrusions (DP) in each shield part are oriented in an axial direction of the tube shield.

4. The tube shield of claim 1 wherein the first and second shield parts are made from a heat resistant material.

5. The tube shield of claim 1 wherein the refractory cement (R) is selected from a group consisting of SiC based refractory cement and alumina based refractory cement.

6. A method for assembling a tube shield on a boiler tube, wherein tube shield parts are assembled over the boiler tube and fixated with refractory cement, comprising:
   configuring complimentary parting surfaces of each tube shield part in a continuous dovetail form,
   providing a dovetail protrusion (DP) in a first shield part with a dovetail protrusion base (DPB) having a first dimension and a dovetail protrusion top (DPT) having a second dimension, the dovetail protrusion (DP) extending in a circumferential direction,
   providing a corresponding dovetail slot (DS) in a second shield part with a dovetail slot base (DSB) having a third dimension and a dovetail slot top (DST) having a fourth dimension, the dovetail slot (DS) extending in the circumferential direction;
   the first dimension of the dovetail protrusion base (DPB) of the dovetail protrusion (DP) being equal or less than the fourth dimension of the dovetail slot top (DST) of the dovetail slot,
   filling each tube shield part at least partly with the refractory cement;
   mounting each tube shield part around the boiler tube while pushing a multitude of dovetail protrusions of the first shield part into engagement with a complimentary multitude of dovetail slots in the second shield part, such that the first and second shield parts are being pushed into each other until a roof of a dovetail protrusion in the first shield part rests against a bottom of the dovetail slot in the second shield part, while pressing excessive refractory cement out through adjoining complimentary parting surfaces of the first and second shield parts and forming a cylindrical tube shield around the boiler tube;
   holding the first and second shield parts in location until the refractory cement cures and fixates the first and second shield parts around the boiler tubes; and
   removing any excessive refractory cement protruding from the adjoining complimentary parting surfaces of the first and second shield parts.

* * * * *